US012785056B2

(12) United States Patent
Lin et al.

(10) Patent No.: US 12,785,056 B2
(45) Date of Patent: Nov. 3, 2026

(54) MASS SPECTROMETER AND METHOD FOR ESTABLISHING VACUUM SYSTEM THEREOF

(71) Applicant: Shimadzu Corporation, Kyoto (JP)

(72) Inventors: Yiming Lin, Shanghai (CN); Saifei Chen, Shanghai (CN)

(73) Assignee: SHIMADZU CORPORATION, Kyoto (JP)

(*) Notice: Subject to any disclaimer, the term of this patent is extended or adjusted under 35 U.S.C. 154(b) by 645 days.

(21) Appl. No.: 18/139,446

(22) Filed: Apr. 26, 2023

(65) Prior Publication Data

US 2023/0352291 A1 Nov. 2, 2023

(30) Foreign Application Priority Data

Apr. 28, 2022 (CN) ......................... 202210471228.3

(51) Int. Cl.
*H01J 49/24* (2006.01)
*H01J 49/00* (2006.01)

(52) U.S. Cl.
CPC .......... *H01J 49/24* (2013.01); *H01J 49/0022* (2013.01)

(58) Field of Classification Search
CPC ...... H01J 49/24; H01J 49/0022; H01J 49/067; H01J 49/40; H01J 49/04; H01J 49/0031; G01N 30/88; G01N 30/7206
See application file for complete search history.

(56) References Cited

U.S. PATENT DOCUMENTS

| | | | | |
|---|---|---|---|---|
| 5,401,298 | A | 3/1995 | Voss | |
| 5,426,300 | A * | 6/1995 | Voss .................... | H01J 49/0022 250/288 |
| 8,829,425 | B1 | 9/2014 | Yang et al. | |
| 2003/0141447 | A1 | 7/2003 | Verentchikov et al. | |
| 2012/0056085 | A1 * | 3/2012 | Giles .................... | G01N 27/624 250/288 |

(Continued)

FOREIGN PATENT DOCUMENTS

| | | | |
|---|---|---|---|
| CN | 1109142 | A | 9/1995 |
| JP | 55109958 | A | 8/1980 |

(Continued)

OTHER PUBLICATIONS

Office Action issued by the Japanese Patent Office for Application No. 2023-068012, Nov. 16, 2023, Japan.

(Continued)

*Primary Examiner* — David E Smith
(74) *Attorney, Agent, or Firm* — Troutman Pepper Locke LLP; Tim Tingkang Xia, Esq.

(57) ABSTRACT

The present invention provides a mass spectrometer and a method for establishing a vacuum system thereof, the mass spectrometer having a hermetical chamber in communication with an external environment only through a vacuum interface, the chamber comprising a first chamber and a second chamber, the second chamber having an adsorption pump disposed therein, the first chamber being in communication with the second chamber through a flow restricting structure. The present solution can be applied to bench-top and even portable mass spectrometers, taking into account the low energy consumption, miniaturization and vacuum requirements of such mass spectrometers.

15 Claims, 3 Drawing Sheets

(56) References Cited

U.S. PATENT DOCUMENTS

| | | | | |
|---|---|---|---|---|
| 2013/0112856 | A1 * | 5/2013 | Ferenc .................... | H01J 43/06 250/216 |
| 2014/0331744 | A1 * | 11/2014 | Van Egmond ........... | H05B 6/36 29/606 |
| 2019/0103263 | A1 | 4/2019 | Giles et al. | |

FOREIGN PATENT DOCUMENTS

| | | | |
|---|---|---|---|
| JP | 60114957 | U | 8/1985 |
| JP | 2003530675 | A | 10/2003 |
| JP | 2019067752 | A | 4/2019 |
| WO | 2010125357 | A2 | 11/2010 |
| WO | 2016083857 | A1 | 6/2016 |

OTHER PUBLICATIONS

Office Action issued by the Japanese Patent Office for Application No. 2023-068012, Apr. 3, 2024, Japan.

Office Action issued by the State Intellectual Property Office of People's Republic of China for Application No. 202210471228.3, Jul. 8, 2026, China.

* cited by examiner

MASS SPECTROMETER AND METHOD FOR ESTABLISHING VACUUM SYSTEM THEREOF

CROSS-REFERENCE TO RELATED PATENT APPLICATION

This application claims priority to and the benefit of Chinese Patent Application Serial No. 202210471228.3, filed Apr. 28, 2022 which is incorporated herein in its entirety by reference.

TECHNICAL FIELD OF THE INVENTION

The present invention relates to the field of analytical instruments, in particular to a mass spectrometer and a method for establishing a vacuum system thereof.

BACKGROUND OF THE INVENTION

Traditional mass spectrometers are typically used in specially established test centers, with a large coverage area, volume and weight. The application of quadrupole technology has reduced the size and weight of mass spectrometers, and with the advent of ion trap technology, the design and production of more lightweight mass spectrometers, even palmtop mass spectrometers, has become one of the main directions of current development of mass spectrometry technology.

Another factor that constrains the lightening of mass spectrometers is their vacuum systems. The components of the mass spectrometer have different requirements for vacuum conditions, it is often necessary to set up a multi-stage vacuum system, and mass analyzers and detectors and the like are generally demanded on a high requirements for vacuum level, for this reason, it is often necessary to have both a pre-pumping pump, which takes up a large volume, and a diffusion pump, which runs continuously, and even if a vacuum pump having a relatively small volume such as a molecular pump is employed, it is difficult to achieve the size reduction requirement of a bench-top mass spectrometer. In addition, portable mass spectrometers also place high demands on the lightening of the vacuum system.

The adsorption pump is a trapping pump that operates based on the adsorption principle and forms a vacuum environment by chemical adsorption, low-temperature adsorption, adsorption after ionization, and the like, and includes a getter pump, an ion pump, a cryopump, and the like. The volume and weight thereof can meet the requirements of a portable mass spectrometer, however, the adsorption pump has a limited amount of adsorption and cannot continue to adsorb gas once the adsorption is saturated, and therefore it is generally used as an auxiliary pump and not as a primary pump alone, and it is additionally required to provide it with a pre-pumping pump, the feeding of which in turn causes an increase in the volume and weight of the vacuum system. In addition, the working gas pressure and the activation gas pressure of the adsorption pump do not match the working gas pressure of the components (e.g., the ion trap, which typically operates in a higher gas pressure environment than the adsorption pump) of the miniaturized mass spectrometer, also impeding the use of the adsorption pump alone as the primary pump in the miniaturized mass spectrometer.

U.S. Pat. No. 8,829,425B1 provides a technical solution using a cryopump as the primary pump of a portable mass spectrometer. The description simply describes the use of a getter pump instead of a cryopump to operate a portable mass spectrometer. However, in this document, the cryopump directly vacuums the chamber in which the ion trap is located and does not give a solution to match the difference between the working gas pressure of the adsorption pump and that of the ion trap.

U.S. Pat. No. 5,426,300A provides a solution using an adsorption pump as the primary pump of a portable mass spectrometer, in this solution a getter pump is also used to directly vacuum the chamber in which the mass analyzer is located. However, in the case of ion traps, this may degrade the lifetime of the getter pump or affect the operation performance of the ion trap due to a mismatch in the working gas pressures of the two.

SUMMARY OF THE INVENTION

For the above problem, i.e. how to provide a vacuum system that can be adapted to bench-top and even portable mass spectrometers, taking into account the requirements of such mass spectrometers for low energy consumption, miniaturization, and vacuum level, more accurately matching the vacuum conditions required for the components of the mass spectrometer, a first aspect of the invention provides a mass spectrometer having a hermetical chamber communicated with external environment only through one or more vacuum interface, the chamber comprising a first chamber and a second chamber, an adsorption pump located in the second chamber, and a flow restrictor through which the first chamber and the second chamber are communicated with each other.

Adsorption pumps are characterized by low energy consumption and miniaturization, but require activation and require a lower working gas pressure range that can draw a vacuum pressure range that may not match the working gas pressure range of some components of the mass spectrometer, such as components that need to operate at low vacuum levels. A mass spectrometer provided according to the first aspect of the invention, mounting an adsorption pump in the second chamber and providing a flow restricting structure between the first chamber and the second chamber such that the working gas pressure of the first chamber can be adjusted by configuring or adjusting the size of the opening of the flow restricting structure or the amount of flow at the vacuum interface (e.g., the sample inlet port) such that the gas pressure of the first chamber is within a range of gas pressures suitable for operation of components within the first chamber.

On the other hand, because the first chamber and the second chamber are hermetical with respect to the external environment, as long as the chamber is vacuumed below the activation gas pressure of the adsorption pump and the adsorption pump is activated before deliver from the factory, the activated adsorption pump can meet the load requirements for vacuuming the hermetical chamber without the need to provide the vacuum system with a turbo pump or any other type of large-volume pre-pumped pump, facilitating the miniaturization and lightening of the vacuum system.

In an alternative technical solution of the invention, an ion trap is arranged in the first chamber, and the gas pressure range of the first chamber is $P1 \geq 10^{-2}$ Pa.

In accordance with the first aspect of the invention, a vacuum system of a mass spectrometer provided can be able to provides a matched working gas pressure range for the ion trap so that the ion trap operates in a preferred gas pressure environment, and that the ion trap can efficiently perform ion manipulation, storage, mass analysis, etc., while being sized to meet the size requirements of the components of a miniaturized mass spectrometer.

In an alternative technical solution of the invention, an ion optical assembly, a detector, a mass analyzer and/or an ion source is/are also provided inside the first chamber.

A mass spectrometer provided according to the first aspect of the invention, by centralizing the ion optical assembly, the detector, the mass analyzer and/or the ion source in the first chamber, i.e. the first chamber acts as the main chamber housing the apparatus, and the second chamber is assisted by the flow restricting structure to provide a buffer for the vacuumed gas flow, the second chamber can take up less space and keep the gas pressure in the first chamber stable.

In an alternative technical solution of the invention, the gas pressure of the second chamber is kept below activation gas pressure of the adsorption pump.

According to the technical solution, maintaining the gas pressure of the second chamber below the activation gas pressure of the adsorption pump can be able to provide and maintain the gas pressure environment necessary for activation of the adsorption pump, thereby enabling the adsorption pump to adsorb gas molecules within the second chamber, and the lower gas pressure environment can retard the progression of the adsorption pump to adsorption saturation, advantageously extending the service life of the adsorption pump.

In an alternative technical solution of the invention, the adsorption pump is a getter pump using alloy as getter material, and the gas pressure range of the second chamber is $P2 \leq 10^{-2}$ Pa.

According to this technical solution, the getter pump made of alloy material has the advantages of high pumping speed, large getter amount, light weight, room temperature pumping after activation without power supply, and can be used repeatedly, and is suitable for miniaturization of mass spectrometer. The gas pressure range $P2 < 10^{-2}$ Pa of the second chamber is a suitable gas pressure environment for the working of getter pumps using alloy as getter material.

In an alternative technical solution of the invention, the mass spectrometer further comprises a vacuum pump interface communicated with the second chamber, and the second chamber communicates with the external vacuum pump via the vacuum pump interface, whereby the gas pressure of the second chamber is pre-pumped to a low-enough safe pressure for adsorption pump activation operation.

According to the technical solution, pre-pumping the second chamber by an external vacuum pump is advantageous that the gas pressure in the second chamber quickly reaches the desired gas pressure environment, and the external vacuum pump can be disconnected after the activation is completed, and the electric energy required for the operation of the adsorption pump can be maintained only by the internal power supply, thereby reducing the mass spectrometer volume, reducing the power consumption and weight of the mass spectrometer, and making it easier to achieve portability.

In an alternative technical solution of the invention, the adsorption pump is a primary pump of the mass spectrometer.

According to this technical solution, the adsorption pump is used as the primary pump while avoiding the feeding of other types of pumps having a large volume, such as a turbo pump or the like, as the primary pump, reducing the volume of the mass spectrometer and reducing the weight of the mass spectrometer, and the adsorption pump requires little external power supply after activation, reducing the power consumption of the mass spectrometer.

In an optional technical solution of the invention, a sample introducing means is further comprised for introducing a sample into the first chamber.

In an alternative technical solution of the invention, the sample introducing means is a gas chromatography sample introducing means, a capillary sample introducing means or a membrane sample introducing means.

In an alternative technical solution of the invention, the sample introducing means further comprises a thermal desorption assembly. The thermal desorption thermal desorption is adapted to convert a solid or liquid sample to a gaseous sample for analysis.

In an alternative technical solution of the invention, the mass spectrometer is a compact mass spectrometer.

In an alternative technical solution of the invention, the flow restricting structure is a flow restricting aperture, a flow restricting valve or a flow restricting tube.

In an alternative technical solution of the invention, the adsorption pump is one or a combination of one or more of a getter pump, an ion pump, a cryopump.

In an alternative technical solution of the invention, the adsorption pump comprises a first adsorption pump and a second adsorption pump, the first adsorption pump is a getter pump using alloy as getter material, and the second adsorption pump is an ion pump, the getter pump is a primary pump of the mass spectrometer, and the ion pump communicates with the first chamber or the second chamber.

According to this solution, the ion pump can help to remove inert gases, which are more difficult to adsorb by the getter pump, improve the type of test to which the mass spectrometer can be applied, and improve the load capacity of the vacuum system.

In an alternative technical solution of the invention, the adsorption pump is an ion pump, the mass spectrometer includes a sector magnetic deflection mass analyzer, and the sector magnetic deflection mass analyzer and the ion pump share the magnet. The manner in which the sector magnetic deflection mass analyzer and the ion pump share magnets can effectively simplify the apparatus and reduce the volume of the apparatus. In this alternative solution, the adsorption pump may be an ion pump alone, without comprising other types of adsorption pumps, in order to effectively simplify the apparatus while satisfying the test requirements.

The invention further provides a method for establishing a vacuum system of a mass spectrometer, the vacuum system comprising a first chamber and a second chamber communicated by mean of a flow restricting structure, an ion trap arranged in the first chamber, and an adsorption pump arranged in the second chamber, and the method comprising:

- pre-pumping, by an external vacuum pump, the second chamber until the gas pressure of the second chamber is reduced below activation gas pressure of the adsorption pump;
- activating the adsorption pump;
- starting the adsorption pump to reduce the gas pressure of the first chamber to be within the working gas pressure range of the ion trap, and
- sealing the first chamber and the second chamber, disconnecting the external vacuum pump, and using the adsorption pump as a primary pump of the vacuum system to maintain vacuum level of the first chamber and the second chamber.

REFERENCE NUMERALS

Figure 1:
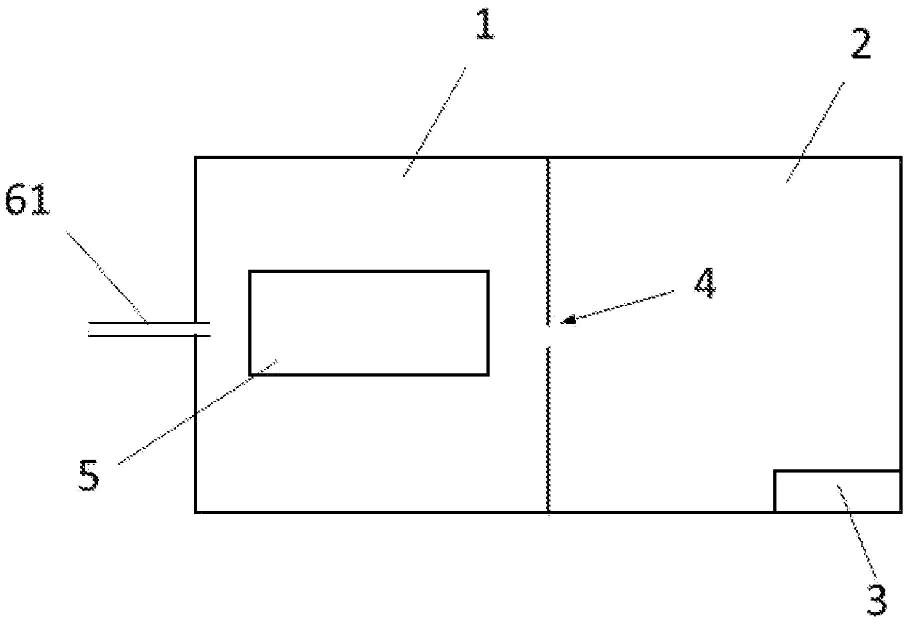
FIG. 1 is a schematic view showing the structure of a mass spectrometer according to a first embodiment of the invention.

First chamber 1; Second chamber 2; Adsorption pump 3; Flow restricting structure 4; Ion trap 5; Capillary sample introducing means 61; Membrane sample introducing means 62; Vacuum pump interface 7.

DETAILED DESCRIPTION OF THE INVENTION

The technical solutions in the embodiments of the present invention will be clearly and completely described below in conjunction with the accompanying drawings in the embodiments of the present invention, and it is obvious that the described embodiments are only a part of the embodiments of the present invention, rather than all of the embodiments. On the basis of the embodiments in the present invention, all other embodiments obtained by those of ordinary skill in the art without making inventive labor fall within the scope of protection of the present invention.

Terms

As used herein, the term "adsorption pump" refers to a trapping pump that operates based on the adsorption principle and forms a vacuum environment by chemical adsorption, low-temperature adsorption, adsorption after ionization, and the like, and includes a getter pump, an ion pump, a cryopump, and the like.

As used herein, the term "getter pump" refers to a chemisorption pump consisting of a getter with a large surface area. Most commonly used are non-evaporable getters (NEG) sintered from alloy materials such as zirconium vanadium iron alloys. After activation (heating in vacuum), it can absorb various reactive gases such as hydrogen, oxygen, water, carbon monoxide, carbon dioxide and nitrogen through three processes of surface adsorption, surface dissociation and bulk diffusion.

As used herein, the term "compact mass spectrometer" refers to a mass spectrometer having a size, volume, weight and power consumption that is significantly smaller than conventional laboratory mass spectrometers, small desktop or portable in volume; weight less than 20 kg.

As used herein, the term "activation gas pressure" refers to a low-enough safe pressure for adsorption pump activation operation, typically in the range of ≤1 Pa.

First Embodiment

Referring to FIG. 1, this embodiment provides a compact mass spectrometer, the mass spectrometer has a hermetical chamber, the chamber is in communication with the external environment only through a vacuum interface. The vacuum interface is normally not open, only open when sample injection or other special conditions are required. When the vacuum interface is not open, the chamber of the mass spectrometer is substantially completely closed, so that the vacuum level inside the mass spectrometer is substantially maintained as long as the vacuum interface is not open.

The hermetical chamber interior comprises a first chamber 1 and a second chamber 2, the second chamber 2 being provided with an adsorption pump 3, the first chamber 1 and the second chamber 2 being in communication with each other via a flow restricting structure 4. The adsorption pump 3 is a pump operating based on the adsorption principle, which uses chemical adsorption, low-temperature adsorption, adsorption after ionization, etc. to form a vacuum environment. Since the adsorption amount is limited, it is impossible to continue adsorbing the gas after reaching the adsorption equilibrium, it is not suitable to operate at a high gas pressure, otherwise the service life is greatly decreased. In addition, the adsorption pump 3 typically requires activation before it is first operated. Activation of the adsorption pump 3 requires lowering the second chamber 2 in which the adsorption pump 3 is located below the activation gas pressure (typically in the range of ≤1 Pa) and activating it by heating, energizing, or the like. The adsorption pump 3 can be stably operated after activation. In addition, in order for the adsorption pump 3 to continue to be stably operated, the gas pressure in the second chamber 2 should also be stably maintained at the working gas pressure of the adsorption pump 3, which is typically less than $10^{-2}$ Pa. In this embodiment, the adsorption pump 3 may be one or a combination of one or more of a getter pump, an ion pump, a cryopump.

Regarding the first chamber 1, the first chamber 1 is typically used for housing functional components, such as ion generation, feeding, control, storage or analysis and the like, of a mass spectrometer, such as an ion source, ion optics, mass analyzer, detector or the like. As one or more of the ion source, the ion optics, the mass analyzer, the detector, etc., it is generally necessary to operate in a suitable gas pressure environment. Optionally by setting the gas pressure range of the first chamber 1 at $P1>10^{-2}$ Pa, functional components such as the ion trap 5 and the like can be satisfied to operate in a preferred barometric environment, while the manipulation, storage and mass analysis and the like of ions are performed efficiently, in this embodiment, it is preferable to use the ion trap 5, which is relative smaller in size compared to other ion optics, mass analyzers and the like, so that the size requirements of the components of the miniaturized mass spectrometer are well met.

It should be noted that the ion source, the ion optics, the mass analyzer, and the detector may be entirely disposed in the first chamber 1, or may be partially disposed in the first chamber 1 and partially disposed in the second chamber 2 or other chambers or the external environment, without departing from the spirit and scope of the present invention. Preferably, a detector, a mass analyzer and/or an ion source are centrally disposed within the first chamber 1, by centralizing the detector, the mass analyzer and/or the ion source in the first chamber 1, i.e. the first chamber 1 acts as the main chamber housing the apparatus, while the second chamber 2 is assisted by the flow-restricting structure 4 to provide a buffer for the vacuumed gas flow, the second chamber 2 can take up less space and keep the gas pressure of the first chamber 1 stable.

This embodiment uses the adsorption pump 3 to vacuum the first chamber 1 and the second chamber 2, and under the action of the flow restricting structure 4, such that the first chamber 1 and the second chamber 2 can provide different gas pressure environments to form a two-stage differential pumping. Specifically, mounting an adsorption pump 3 in the second chamber 2, and providing a flow restricting structure 4 between the first chamber 1 and the second chamber 2, the adsorption pump 3 may be used as the primary pump to maintain vacuum conditions of the mass spectrometer, and the working gas pressure of the first chamber 1 is adjusted by configuring or adjusting the size of the opening of the flow restricting structure 4 or the flow rate of the sample introducing device (corresponding to the vacuum interface in this embodiment) so that the gas pressure of the first chamber 1 is within an gas pressure range suitable for the operation of its internal components.

On the other hand, since the first chamber 1 and the second chamber 2 are hermetical with respect to the external environment, as long as the chamber is vacuumed below the activation gas pressure of the adsorption pump 3 before deliver from the factory and the adsorption pump 3 is activated, the activated adsorption pump 3 can satisfy the load requirements for vacuuming the hermetical chamber without the need to provide the vacuum system with a turbo pump or any other type of large-volume pre-pumped pump, facilitating the miniaturization and lightening of the vacuum system.

In embodiments of the invention, the flow restricting structure 4 includes, but is not limited to, one or more of a flow restricting aperture a flow restricting valve, or a flow restricting tube and the like. The pore size, pipe diameter, etc. of the flow restricting structure 4 may be determined based on a combination of the gas pressure requirements of the first chamber 1, the flow rate of the sample introducing device, and the pumping speed of the adsorption pump 3. The presence of the flow restricting structure 4 not only regulates the gas pressure level of the first chamber 1, but also stabilizes the gas pressure environment within the first chamber 1 by restricting the vacuumed flow so that the functional components within the first chamber 1 operate in a stable gas pressure environment.

In summary, since the mass spectrometer in this embodiment uses the adsorption pump 3 as a primary pump, which is vacuumed based on the adsorption principle after activation of the adsorption pump 3, the energy consumption thereof is almost negligible, and the size of the adsorption pump 3 is small and is particularly suitable for use as a vacuum system of a portable mass spectrometer without external power supply, making a portable or even a palmtop mass spectrometer possible. Moreover, both the first chamber 1 and the second chamber 2 are all hermetical chambers, and the gas pressure condition in the chambers can be maintained for a long period of time, and the vacuum environment maintained for a long period of time can prevent the adsorption pump 3 from reaching adsorption saturation too quickly, which is advantageous for extending the service life of the adsorption pump 3.

In other embodiments of the invention, the adsorption pump 3 may be an ion pump, the mass analyzer of the mass spectrometer may be a sector magnetic deflection mass analyzer, and the sector magnetic deflection mass analyzer and the ion pump share a magnet. The manner in which the magnetic sector magnetic deflection mass analyzer and the ion pump share magnets can effectively simplify the apparatus and reduce the volume of the apparatus. In this embodiment, the adsorption pump is an individual ion pump, i.e. the mass spectrometer includes no other type of adsorption pump, in order to effectively simplify the apparatus while meeting the test requirements.

The ion source can be, for example, electrospray, corona discharge, dielectric barrier discharge, glow discharge, electron impact, photoionization, and the like.

The mass analyzer may be, for example, an ion trap, quadrupole, time-of-flight, sector magnetic deflection, ion cyclotron resonance, or the like.

The detector may be, for example, an electron multiplier, a Faraday cartridge, a photomultiplier tube, a microchannel plate, or the like.

In this embodiment, the first chamber 1 is in communication with the external environment only through a capillary sample introducing means 61 having a valve for opening/closing the sample introducing, and the valve can be closed to maintain a vacuum environment inside the mass spectrometer when the mass spectrometer does not need to perform the sample introducing, avoiding air ingress to reduce the service life of the adsorption pump 3. When an analytical test is required, the valve can be opened and a capillary sample introducing means 61 can be used to perform the sample introducing. In some embodiments, the sample introducing means may further comprise a thermal desorption assembly for converting a solid or liquid sample to a gaseous sample for analysis.

Second Embodiment

Figure 2:
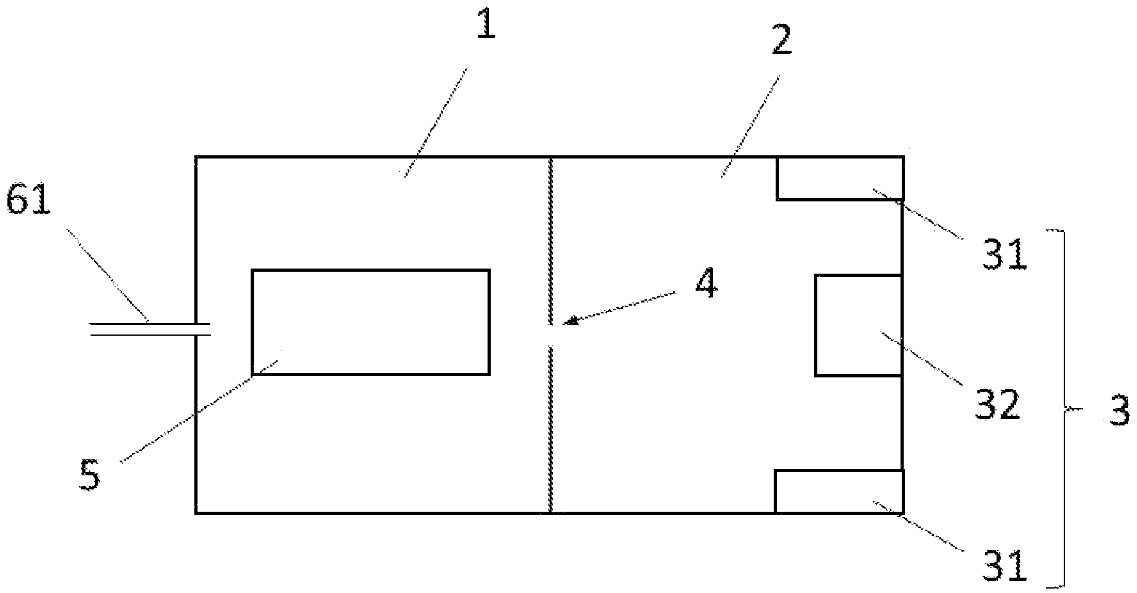
FIG. 2 is a schematic view showing the structure of a mass spectrometer according to a second embodiment of the invention.

FIG. 2 is a schematic view showing a structure of a mass spectrometer in a second embodiment of the present invention.

In this embodiment, the main structure of the mass spectrometer comprises a first chamber 1, a second chamber 2, an adsorption pump 3, a flow restricting structure 4, an ion trap 5. Besides that in this embodiment, the adsorption pump 3 further includes two types of adsorption pumps 3 such as a getter pump and an ion pump, other components and reference numerals are the same as those shown in FIG. 1 of the first embodiment, and will not be described in detail here.

As shown in FIG. 2, in this embodiment, the adsorption pump 3 arranged in the second chamber 2 comprises a first adsorption pump 31, which is a getter pump with an alloy as getter material, and a second adsorption pump 32, which is an ion pump, the adsorption pump is the primary pump of the mass spectrometer, the ion pump can be in communication with the first chamber 1 or with the second chamber 2, in this embodiment the ion pump is in communication with the second chamber 2.

Getter pump which fully use chemisorption without evaporation and electromagnetic contamination, are typically used in large systems as auxiliary pumps for increasing the pumping speed and increasing the vacuum level, i.e., after pre-pumping with turbo pumps or molecular pumps, the getter pump is used to further vacuum to increase the vacuum level. Whereas in this embodiment, the combination of the adsorption pump 3 using a getter pump and an ion pump acts as a primary pump for the mass spectrometer, and by configuring the chamber as a whole as a hermetical chamber to maintain the hermetical conditions required for the getter pump itself to operate, it is not necessary to configure the vacuum system with a turbo pump, a molecular pump or any other bulky and energy-intensive pre-pumping pump, facilitating the miniaturization and lightening of the vacuum system. Preferably, in this embodiment, the getter pump is a getter pump with alloy as the getter material, which has the advantages of high pumping speed (>10 l/s for air), large amount of getter, light weight (it can be lightened to 16 g), no vibration, no power supply for pumping at room temperature after activation, and can be used repeatedly, and is suitable for establishing vacuum systems of miniaturized mass spectrometers.

The ion pump can help remove inert gases that are more difficult to adsorb by the getter pump, and also has a certain pumping rate for the air. The combination of the two can effectively adsorb or remove gases of different constituents in the sample gas or air, and in particular, the getter pump has several times of the pumping speed and thousands of times of the adsorption capacity for hydrogen gas, and is well suited for tests using hydrogen gas as a carrier gas such as gas chromatography or tests containing hydrogen gas at a high concentration in the sample gas.

Third Embodiment

Figure 3:
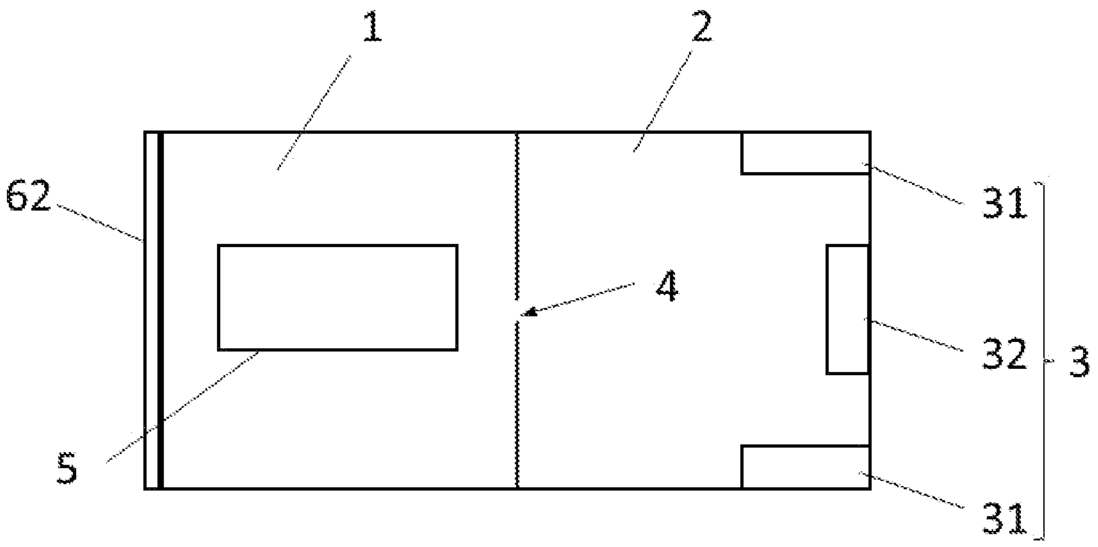
FIG. 3 is a schematic view showing the structure of a mass spectrometer according to a third embodiment of the invention.

FIG. 3 is a schematic view showing a structure of a mass spectrometer in a third embodiment of the invention.

In this embodiment, the main structure of the mass spectrometer comprises a first chamber 1, a second chamber 2, an adsorption pump 3, a flow restricting structure 4, an ion trap 5. Besides that in this embodiment, the sample introducing means is a membrane sample introducing means 62 (membrane interface), other components and reference numerals are the same as those shown in FIG. 2 of the second embodiment, and will not be described in detail herein. The use of the membrane sample introducing means 62 effectively compromises the vacuum maintenance and the convenience to introduce the sample in the first and second chambers 1, 2.

Fourth Embodiment

Figure 4:
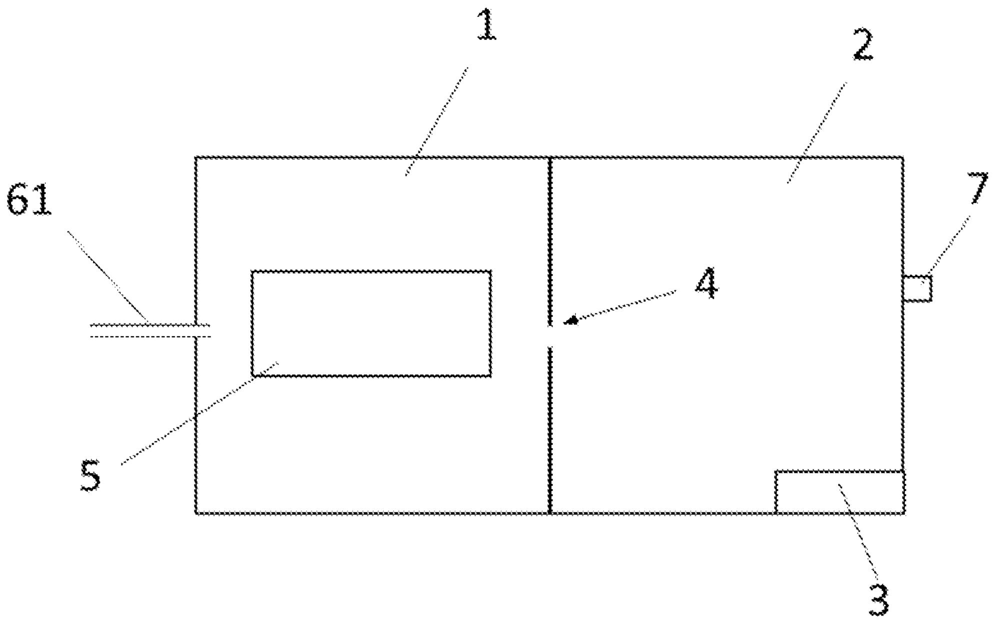
FIG. 4 is a schematic view showing the structure of a mass spectrometer according to a fourth embodiment of the invention.

FIG. 4 is a schematic view showing the structure of a mass spectrometer in a fourth embodiment of the invention.

In this embodiment, the main structure of the mass spectrometer comprises a first chamber 1, a second chamber 2, an adsorption pump 3, a flow restricting structure 4, an ion trap 5. Besides that in this embodiment the vacuum interface of the chamber of the mass spectrometer in communication with the external environment further comprises a vacuum pump interface 7, other components and reference numerals are the same as shown in FIG. 1 of the first embodiment and will not be described in detail here.

In this embodiment, the mass spectrometer further comprises a vacuum pump interface 7 in communication with the second chamber 2, via which the second chamber 2 can be in communication with an external vacuum pump (not shown in the figure) for pre-pumping the gas pressure of the second chamber 2 to within the activation gas pressure range of the adsorption pump 3.

In the above manner, the pre-pumping of the second chamber 2 by the external vacuum pump facilitates the gas pressure inside the second chamber 2 to reach quickly the gas pressure environment required for the activation of the adsorption pump 3, and after the end of the activation, the external vacuum pump can be disconnected to maintain only the electric energy required for the operation of the adsorption pump 3 by the internal power supply to stably maintain the normal operation of the vacuum system of the mass spectrometer in time.

Figure 5:
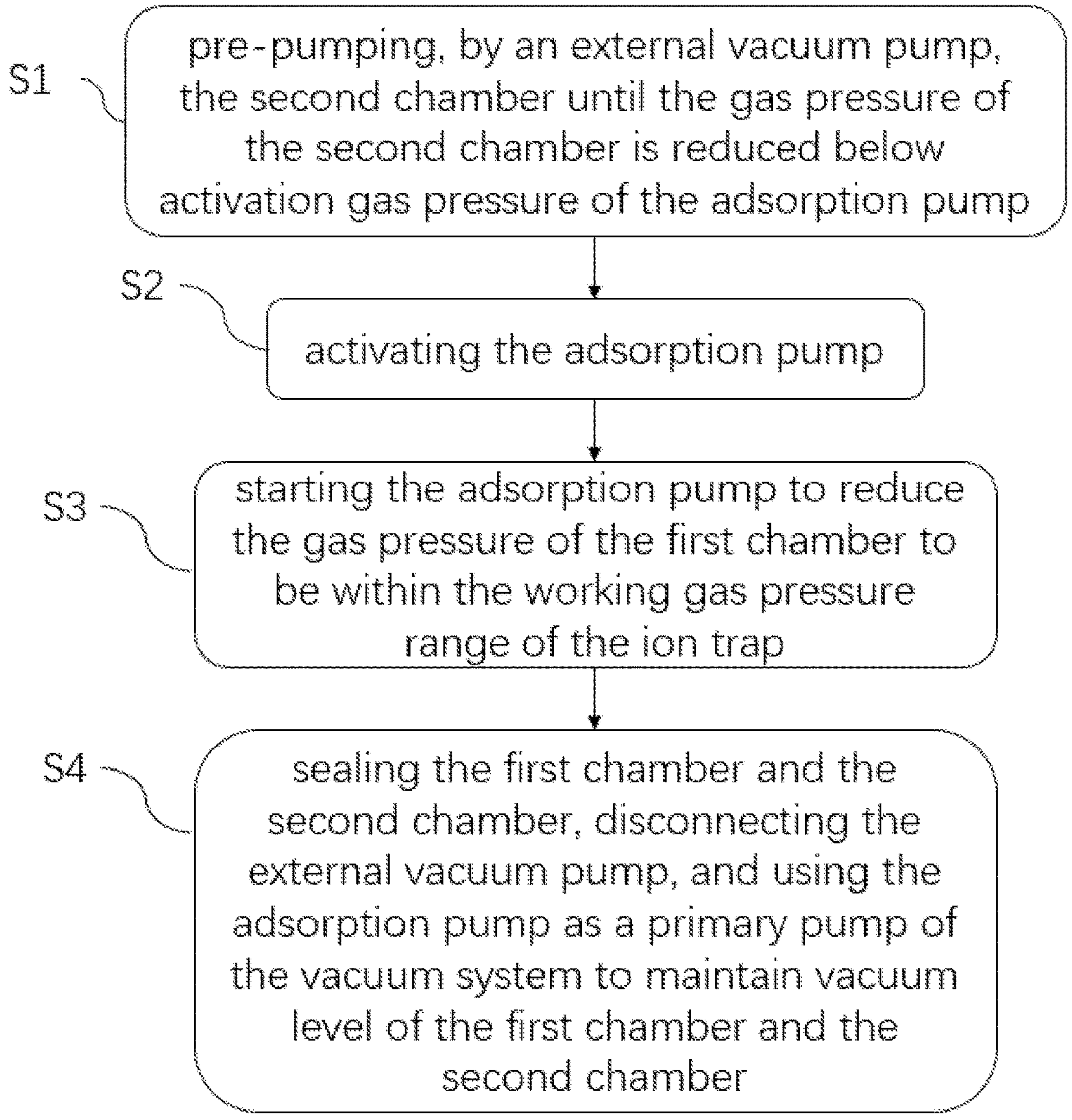
FIG. 5 is a flow chart showing a method for establishing a vacuum system of a mass spectrometer in the fourth embodiment of the invention.

With reference to FIG. 5, this embodiment further provides a method for establishing a vacuum system for a mass spectrometer. The vacuum system comprises a first chamber 1 and a second chamber 2 communicated by mean of a flow restricting structure 4, with an ion trap 5 disposed in the first chamber 1 and an adsorption pump 3 disposed in the second chamber 2, the method of forming comprises the steps of:

S1: pre-pumping, by an external vacuum pump, the second chamber 2 until the gas pressure of the second chamber 2 is reduced below activation gas pressure of the adsorption pump 3;

S2: activating adsorption pump 3;

S3: starting the adsorption pump 3 to reduce the gas pressure of the first chamber 1 to be within the working gas pressure range of the ion trap 5, and S4: sealing the first chamber 1 and the second chamber 2, and disconnecting the external vacuum pump, using the adsorption pump 3 as the primary pump of the vacuum system to maintain the vacuum level of the first chamber 1 and the second chamber 2.

In the above manner, the vacuum system can be provided with a vacuum pump connected at the vacuum pump interface 7 just prior to initial use, for example before delivering from the factory, to complete the pre-vacuuming and activation of the adsorption pump 3, and subsequent vacuum levels can be maintained with the adsorption pump 3. After shipment, the chamber can also be opened for service or maintenance using the vacuum pump interface 7, increasing the convenience of production and maintenance of the mass spectrometer.

It is to be noted that, although in the above embodiments, the vacuum system of the mass spectrometer comprises only two stages of a first chamber 1 and a second chamber 2, however, the embodiments described above are only illustrative, in other embodiments of the invention, three-stage or more vacuum systems may be used, i.e., additional chambers may be provided between the first chamber 1 and the second chamber 2, and the ion source, ion trap 5 and the like ion generating means, ion optics, detector, or mass analyzer may be positioned as desired.

In the above-described embodiments of the invention, the adsorption pump 3 may be used as a primary pump. The adsorption pump 3 has advantages of high pumping speed (pumping speed for air>10 l/s, weight of getter material is only 16 g), large adsorption capacity, light weight, room temperature pumping without power supply after activation, and can be used repeatedly, adopting the adsorption pump 3 as a primary pump, reduces the volume of the mass spectrometer, reduces the power consumption and weight of the mass spectrometer, and makes it easier to achieve portability.

In the above embodiment of the invention, preferably at least one of the adsorption pumps 3 used in the mass spectrometer is a getter pump with an alloy as getter material and the gas pressure of the second chamber 2 is in the range $P2<10^{-2}$ Pa. The getter pump of alloy material has the advantages of high pumping speed, large adsorption capacity, light weight, room temperature pumping without power supply after activation, and can be repeatedly activated and used, and is suitable for miniaturization of mass spectrometer. The gas pressure range $P2<10^{-2}$ Pa of the second chamber 2 is a gas pressure environment suitable for the working of getter pump with alloys as getter material, advantageously extending the service life of the getter pump.

The foregoing are merely preferred embodiments of the present invention and is not intended to limit the invention. It is intended to cover various modifications, equivalents, and improvements within the spirit and principles of the present invention.

What is claimed is:

1. A mass spectrometer, comprising:

a hermetical chamber communicated with external environment only through one or more vacuum interface, the chamber comprising a first chamber and a second chamber, an adsorption pump located in the second chamber; and a flow restricting structure through which the first chamber and the second chamber are communicated with each other, wherein an ion trap is arranged in the first chamber, and the gas pressure range of the first chamber is $P1 \geq 10^{-2}$ Pa; and wherein the gas pressure of the second chamber is kept below activation gas pressure of the adsorption pump.

2. The mass spectrometer of claim 1, wherein a detector, a mass analyzer and/or an ion source are also disposed in the first chamber.

3. The mass spectrometer of claim 1, wherein the adsorption pump is a getter pump using alloy as getter material, and the gas pressure range of the second chamber is $P2 \leq 10^{-2}$ Pa.

4. The mass spectrometer of claim 1, wherein the vacuum interface comprises a vacuum pump interface communicated with the second chamber, and the second chamber communicates with the external vacuum pump via the vacuum pump interface, whereby the gas pressure of the second chamber is pre-pumped to a low-enough safe pressure for adsorption pump activation operation.

5. The mass spectrometer of claim 1, wherein the adsorption pump is a primary pump of the mass spectrometer.

6. The mass spectrometer of claim 1, further comprising a sample introducing means for introducing a sample into the first chamber.

7. The mass spectrometer of claim 6, wherein the sample introduction means is a gas chromatography sample introducing means, a capillary sample introducing means or a membrane sample introducing means.

8. The mass spectrometer of claim 7, wherein the carrier gas of the gas chromatography is hydrogen, helium or nitrogen.

9. The mass spectrometer of claim 7, wherein the sample introducing means further comprises a thermal desorption assembly.

10. The mass spectrometer of claim 1, wherein the mass spectrometer is a compact mass spectrometer.

11. The mass spectrometer of claim 1, wherein the flow restricting structure is a flow restricting aperture, a flow restricting valve or a flow restricting tube.

12. The mass spectrometer of claim 1, wherein the adsorption pump is one or a combination of one or more of a getter pump, an ion pump, a cryopump.

13. The mass spectrometer of claim 12, wherein the adsorption pump comprises a first adsorption pump and a second adsorption pump, the first adsorption pump is a getter pump using alloy as getter material, and the second adsorption pump is an ion pump, the getter pump is a primary pump of the mass spectrometer, and the ion pump communicates with the first chamber or the second chamber.

14. The mass spectrometer of claim 12, wherein the adsorption pump is an ion pump, the mass spectrometer includes a sector magnetic deflection mass analyzer, and the sector magnetic deflection mass analyzer and the ion pump share the magnet.

15. A method for establishing a vacuum system of a mass spectrometer, the vacuum system comprising a first chamber and a second chamber communicated by mean of a flow restricting structure, an ion trap disposed in the first chamber, and an adsorption pump disposed in the second chamber, and the method comprising the steps of:

pre-pumping, by an external vacuum pump, the second chamber until the gas pressure of the second chamber is reduced below activation gas pressure of the adsorption pump;

activating the adsorption pump;

starting the adsorption pump to reduce the gas pressure of the first chamber to be within the working gas pressure range of the ion trap, and sealing the first chamber and the second chamber, disconnecting the external vacuum pump, and using the adsorption pump as a primary pump of the vacuum system to maintain vacuum level of the first chamber and the second chamber.

* * * * *